United States Patent
Tripp et al.

(10) Patent No.: US 9,942,258 B2
(45) Date of Patent: Apr. 10, 2018

(54) RUNTIME PROTECTION OF WEB SERVICES

(71) Applicant: International Business Machines Corporation, Armonk, NY (US)

(72) Inventors: Omer Tripp, Bronx, NY (US); Emmanuel Wurth, Muret (FR)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 14/719,613

(22) Filed: May 22, 2015

(65) Prior Publication Data

US 2015/0373042 A1    Dec. 24, 2015

(30) Foreign Application Priority Data

Jun. 18, 2014    (GB) .................................. 1410822.9

(51) Int. Cl.
*H04L 29/06* (2006.01)
*G06F 21/57* (2013.01)

(52) U.S. Cl.
CPC ........ *H04L 63/1433* (2013.01); *G06F 21/577* (2013.01); *H04L 63/1441* (2013.01); *H04L 63/20* (2013.01); *G06F 2221/033* (2013.01); *G06F 2221/2101* (2013.01)

(58) Field of Classification Search
CPC . H04L 63/20; H04L 63/1441; H04L 63/1433; G06F 21/577; G06F 2221/033; G06F 2221/2101
See application file for complete search history.

(56) References Cited

U.S. PATENT DOCUMENTS

| | | | | |
|---|---|---|---|---|
| 8,316,448 B2* | 11/2012 | Peinado | ................... | G06F 21/52 726/25 |
| 8,402,081 B2* | 3/2013 | Sandoval | .......... | G06F 17/30569 709/201 |
| 8,555,269 B2* | 10/2013 | Huang | .................... | G06F 21/54 717/131 |
| 8,613,080 B2* | 12/2013 | Wysopal | ............. | G06F 11/3612 726/19 |
| 8,615,804 B2 | 12/2013 | Mui et al. | | |
| 2004/0015712 A1* | 1/2004 | Szor | ...................... | G06F 21/566 726/24 |
| 2004/0255165 A1* | 12/2004 | Szor | ...................... | G06F 21/566 726/24 |

(Continued)

OTHER PUBLICATIONS

Application No. 1410822.9 (United Kingdom), titled "Runtime Protection of Web Services," filed on Jun. 18, 2014, pp. 1-26.

(Continued)

*Primary Examiner* — Khoi Le
(74) *Attorney, Agent, or Firm* — Heather S. Chatterton

(57) ABSTRACT

Protecting a runtime Web service application. A web service application is instrumented to log its operation and allow recreation of its execution trace. Trace point vulnerabilities are identified using one or more data payloads. Candidate trace point operations associated with the trace point vulnerabilities are identified. Supplementary candidate operations are computed based on the existing trace point operations and the one or more data payloads. The Web service application is further instrumented with the one or more supplementary candidate operations.

15 Claims, 5 Drawing Sheets

(56) References Cited

U.S. PATENT DOCUMENTS

| | | | | |
|---|---|---|---|---|
| 2008/0184208 A1* | 7/2008 | Sreedhar | | G06F 21/577 |
| | | | | 717/128 |
| 2008/0263671 A1* | 10/2008 | Solino Testa | | G06F 21/577 |
| | | | | 726/25 |
| 2009/0113550 A1* | 4/2009 | Costa | | G06F 21/52 |
| | | | | 726/25 |
| 2009/0149221 A1* | 6/2009 | Liu | | H04W 88/085 |
| | | | | 455/561 |
| 2009/0282480 A1 | 11/2009 | Lee et al. | | |
| 2010/0235877 A1* | 9/2010 | Hu | | H04L 63/0227 |
| | | | | 726/1 |
| 2011/0030057 A1* | 2/2011 | Chen | | H04L 63/1416 |
| | | | | 726/23 |
| 2013/0007529 A1 | 1/2013 | Pistoia et al. | | |
| 2013/0091578 A1* | 4/2013 | Bisht | | G06F 21/53 |
| | | | | 726/25 |

OTHER PUBLICATIONS

IBM, "IBM Security AppScan Standard," http://www-01.ibm.com/software/awdtools/appscan/standard/, Accessed on Mar. 20, 2015, pp. 1-2.

IBM, "IBM Security AppScan Source," http://www-01.ibm.com/software/rational/products/appscan/source/, Accessed on Mar. 20, 2015, pp. 1-2.

Felmetsger et al., "Toward Automated Detection of Logic Vulnerabilities in Web Applications," USENIX Security '10 Proceedings of the 19th USENIX conference on Security, 2010, pp. 1-18.

Scholte et al., "Preventing Input Validation Vulnerabilities in Web Applications through Automated Type Analysis," Computer Software and Applications Conference (COMPSAC), 2012, IEEE 36th Annual conference, Jul. 16-20, 2012, pp. 1-11.

Livshits et al., "Towards Fully Automatic Placement of Security Sanitizers and Declassifiers," POPL '13 Proceedings of the 40th annual ACM SIGPLAN-SIGACT symposium on Principles of programming languages, Jan. 23-25, 2013, pp. 1-14.

Tripp et al., "TAJ: Effective Taint Analysis of Web Applications," PLDI '09 Proceedings of the 2009 ACM SIGPLAN conference on Programming language design and implementation, Jun. 15-20, 2009, pp. 1-11.

Petukhov et al., "Detecting Security Vulnerabilities in Web Applications Using Dynamic Analysis with Penetration Testing," OWASP Application Security Conference, May 19-22, 2008, pp. 1-16.

* cited by examiner

Web Service Protection Module 200

Data Payloads p1 ... pN

Trace Instrumenter 202

Vulnerability Detector 204

Security Rules 205

Taint Analyzer 206

String Analyzer 208

Defensive Instrumenter 210

Web Service Protection Method 300

FIGURE 2

401 String name = request.getParameter("name");  — Source

402' String sanitized = santitizeXSS1(santizeXSS(name));

XSS Security Rule  — Trust boundary

403 Response.getWriter().write("Hello"+sanitized+"!");  — Sink 404 static String santizeXSS(String value){
   value = value.replace("<","")replace(">","");
}

.*=>^{<,>}*

405 static String santizeXSS1(String value){
   value = value.replace("javascript:","");
} remove javascript

FIGURE 4B

RUNTIME PROTECTION OF WEB SERVICES

BACKGROUND

The present invention relates to runtime protection of Web services, and more particularly to automatically instrumenting Web service application code to detect potential vulnerabilities.

Perfect enforcement of a security specification, for example to avoid all possible instances of an injection vulnerability like SQL injection, is a hard problem. This is true in general, and specifically when the person responsible for implementing the security defenses is a software engineer without any special background in application security.

This problematic situation is the reason for many reports of severe security attacks against Web sites owned by banks, corporations and governments. In response, a variety of testing and analysis tools have been developed to detect potential security vulnerabilities. These include algorithms for static security verification like IBM AppScanSrc, as well as black-box and glass-box security testing products like IBM AppScanStd. IBM is a registered trademark of International Business Machines Corporation in the US and/or other countries.

While automated tools assist the developer in discovering potential security problems, the responsibility for fixing these problems ultimately remains in the hands of the developer. This means that if the security fix the developer has applied is wrong, or partial, then the application is still released in a vulnerable state.

Another related serious problem is that the quality of the analysis performed by the automated algorithm critically depends on how comprehensive and accurate the algorithm's configuration is. One example is the need by the user to input all sanitizer and validator methods appearing in the application's scope when using tools like IBM AppScanSrc. If the user inputs a wrong or broken defense, then this can result in false negatives. If, on the other hand, the user forgets to include a correct defense, then false positives are likely.

BRIEF SUMMARY

Embodiments of the present invention disclose a method, computer program product, and system for protecting a runtime Web service application. A web service application is instrumented to log its operation and allow recreation of its execution trace. Trace point vulnerabilities are identified using one or more data payloads. Candidate trace point operations associated with the trace point vulnerabilities are identified. Supplementary candidate operations are computed based on the existing trace point operations and the one or more data payloads, and the Web service application is further instrumented with the one or more supplementary candidate operations.

A supplementary candidate operation is one type of software fix for a trace point vulnerability. A trace point vulnerability (also known as a hypothesized trusted boundary) is a point in an operation when good data (data that can be trusted) can change into bad data or vulnerable data (data that cannot be trusted). It is envisaged that other types of software fixes could correct trace point vulnerabilities. In the preferred embodiment, hypothesized trusted boundaries of the application are inferred based on inspection of a finite number of execution traces (for example resulting from testing), and security defenses are enforced on every transition into trusted areas.

Various advantages may be realized. The user need not provide a specification as this is inferred by the algorithm. Also, the system is robust against user mistakes in the implementation of security defenses, compensating for the missing defense logic automatically. These two advantages show how the preferred embodiment may overcome the inherent limitations of existing analysis and testing approaches.

In various embodiments, defenses implemented by the user or developer may be improved. Defenses implemented by the user or developer may address intended trust boundaries, while embodiments of the invention may implement automatic enforcement of defenses along extracted trust boundaries. The preferred embodiment detects which defenses are enforced and which defenses are still missing, as well as where to insert additional security checks.

In various embodiments of the invention, the code of a Web service is modified by the embodiment such that the Web service application operates in a new way, which may lead to an increase in the reliability of the Web service application.

BRIEF DESCRIPTION OF THE DRAWINGS

Preferred embodiments of the present invention will now be described, by way of example only, with reference to the following drawings in which:

FIG. 2 is a component diagram of the preferred embodiment;

FIG. 4B is the example application after performance of the preferred embodiment.

DETAILED DESCRIPTION

Figure 1:
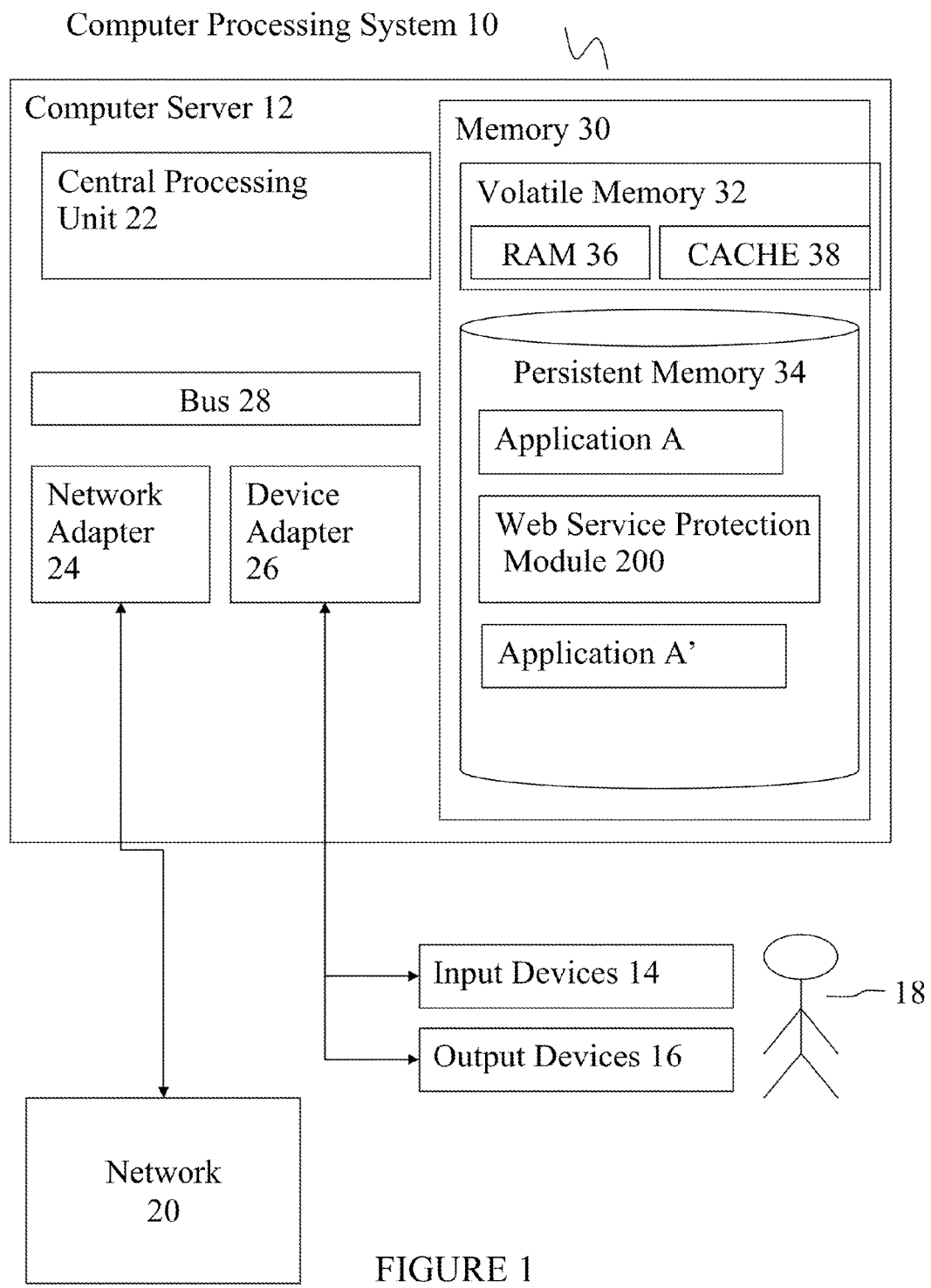
FIG. 1 is a deployment diagram of the preferred embodiment.

Referring to FIG. 1, the deployment of a preferred embodiment in computer processing system 10 is described. Computer processing system 10 is operational with numerous other general purpose or special purpose computing system environments or configurations. Examples of well-known computing processing systems, environments, and/or configurations that may be suitable for use with computer processing system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer processing system 10 may be described in the general context of computer system-executable instructions, such as program modules, being executed by a computer processor. Generally, program modules may include routines, programs, objects, components, logic, and data structures that perform particular tasks or implement particular abstract data types. Computer processing system 10 may be embodied in distributed cloud computing environments where tasks are performed by remote processing devices that are linked through a communications network. In a distributed cloud computing environment, program modules may be located in both local and remote computer system storage media including memory storage devices.

Computer processing system 10 includes general-purpose computer server 12 and one or more input devices 14 and output devices 16 directly attached to the computer server 12. Computer processing system 10 is connected to a network 20. Computer processing system 10 communicates with a user 18 using input devices 14 and output devices 16. Input devices 14 include one or more of a keyboard, a scanner, a mouse, trackball or another pointing device. Output devices 16 include one or more of a display or a printer. Computer processing system 10 communicates with network devices (not shown) over network 20. Network 20 can be a local area network (LAN), a wide area network (WAN), or the Internet.

Computer server 12 includes central processing unit (CPU) 22, network adapter 24, device adapter 26, bus 28, and memory 30.

CPU 22 loads machine instructions from memory 30 and performs machine operations in response to the instructions. Such machine operations include incrementing or decrementing a value in a register, transferring a value from memory 30 to a register or vice versa, branching to a different location in memory if a condition is true or false (also known as a conditional branch instruction), and adding or subtracting the values in two different registers and loading the result in another register. A typical CPU can perform many different machine operations. A set of machine instructions is called a machine code program. The machine instructions are written in a machine code language, which is referred to as a low level language. A computer program written in a high level language needs to be compiled to a machine code program before it can be run. Alternatively, a machine code program such as a virtual machine or an interpreter can interpret a high level language in terms of machine operations.

Network adapter 24 is connected to bus 28 and network 20 for enabling communication between the computer server 12 and network devices. Device adapter 26 is connected to bus 28, input devices 14, and output devices 16 for enabling communication between computer server 12 and input devices 14 and output devices 16.

Bus 28 couples the main system components together. Bus 28 represents one or more types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. Examples of volatile memory 32 are random access memory (RAM) 36 and cache memory 38. Generally, volatile memory is used because it is faster and generally non-volatile memory is used because it will hold the data for longer. Computer processing system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided, including an external port for removable, non-volatile solid-state memory, an optical disk drive for reading from or writing to a removable, non-volatile optical disk such as a compact disk (CD), digital video disk (DVD) or Blu-ray. In such instances, each can be connected to bus 28 by one or more data media interfaces.

Computer processing system 10 communicates with at least one network 20, such as a local area network (LAN), a general wide area network (WAN), and/or a public network like the Internet, via network adapter 24. Network adapter 24 communicates with the other components of computer server 12 via bus 28. It should be understood that although not shown, other hardware and/or software components may be used in conjunction with computer processing system 10. Examples, include, but are not limited to, microcode, device drivers, redundant processing units, external disk drive arrays, redundant array of independent disks (RAID), tape drives, and data archival storage systems.

As will be further depicted and described below, memory 30 includes application A, application A', and Web service protection module 200 configured to carry out the functions of the preferred embodiment of the invention. Further program modules that support the preferred embodiment but are not shown include firmware, boot strap programs, operating systems, Web servers, and support applications. Each of the operating system, support applications, other program modules, and program data, or some combination thereof, may include an implementation of a networking environment. In the preferred embodiment, application A is the Web service application for input to Web service protection module 200, and application A' is the instrumented version of application A featuring self-protection capabilities of the preferred embodiment.

Referring to FIG. 2, Web service protection module 200 includes data payloads p1 to pN, trace instrumenter 202, vulnerability detector 204, security rules 205, taint analyzer 206, string analyzer 208, defensive instrumenter 210, and Web service protection method 300.

Data payloads p1 to pN are example sets of data to test different payloads through the application A and protection application A'.

Trace instrumenter 202 operates to instrument a Web service application such that the Web service application is enabled to log its operation and allowing creation of its execution trace.

Vulnerability detector 204 operates to identify trace point vulnerabilities using one or more data payloads and using one or more security rules 205. A vulnerability is a test that fails against one of the security rules.

Security rules 205 define the nature of data output. For instance, an example security rule is that a data output from an input field on a Web page must not include the characters '<' or '>' or any JavaScript.

Taint analyzer 206 operates to check data flow through an application from application input (source) to output (sink) using one of data payloads p1 to pN and to specify one or more security rules to define which input data must not reach the output.

String analyzer 208 operates to compute supplementary trace point operations by approximating the possible variants of existing trace point operations.

Defensive instrumenter 210 operates to instrument the application with the supplementary trace point operations.

Web service protection method 300 performs the preferred embodiment of the invention using the above components. and is described in more detail below.

Figure 3:
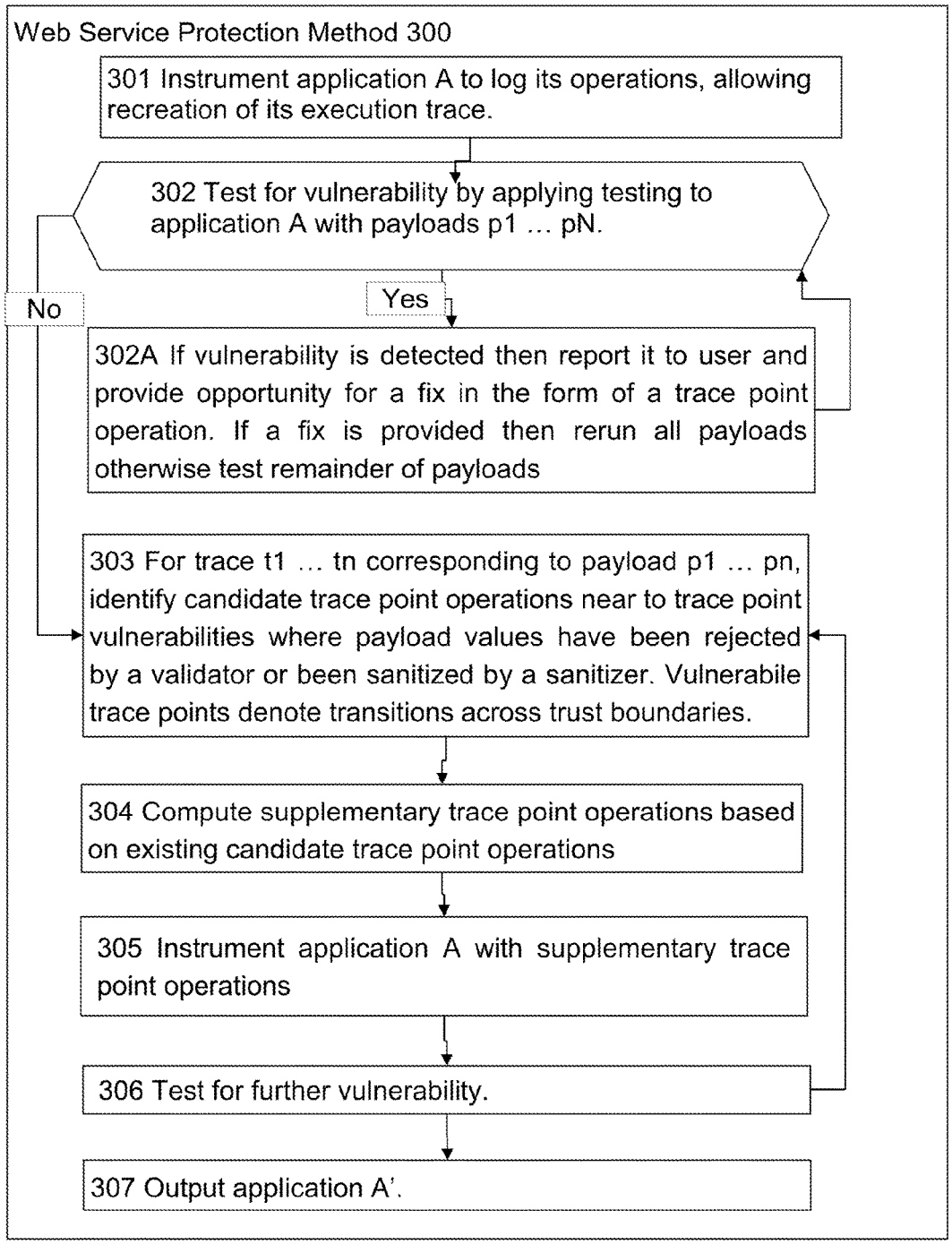
FIG. 3 is a flow diagram of a process of the preferred embodiment.

Referring to FIG. 3, web service protection method 300 includes logical process steps 301 to 307.

Step 301 instruments application A to log its operations, allowing recreation of its execution trace.

Step 302 tests application A for one or more vulnerabilities by applying payloads p1 ... pN and using one or more security rules 205. If a vulnerability is identified then step 302A is executed. If a vulnerability is not identified then step 303 is executed.

Step 302A reports a vulnerability to user 18 and provides an opportunity for a fix in the form of a user applied trace point operation. If a fix is provided then all payload testing is rerun at step 302. Otherwise, the remainder of payloads are tested at step 302.

If a vulnerability is not identified in step 302, then step 303 identifies candidate trace point operations near to trace point vulnerabilities where payload values have been rejected by a validator or been sanitized by a sanitizer. Step 303 performs traces t1 to tN corresponding to payloads p1 to pN. Trace point vulnerabilities denote transitions across trust boundaries.

Consider trace S=[s1 ... sN] due to some payload p. For this particular trace, let Src(S) be the source statements along S—that is, the statements that read user-provided, and thus untrusted, data—and let Snk(S) be the statements that perform security-sensitive operations. For each pair of statements (src,snk) in Src(S)×Snk(S), the existence of data flow from src to snk is checked statistically using taint analyzer 206. If there is data flow then security rules 205 using taint analyzer 206 specify which data values emanating from src must not reach snk.

Step 304 computes supplementary trace point operations based on existing candidate trace point operations and vulnerabilities, in light of the security rules, for the data values participating in the flow from src to snk. String analysis is applied to approximate the possible string values that each data value may assume at each of the program points s1 ... sN. Since the flow is safe, there necessarily exists a (first) point si along the flow from src to snk starting from which all string values are safe. This form of analysis can now be repeated for multiple traces (each due to a different payload pi). All the candidate points' si can now be collected, and a search may be performed in the neighborhood of each statement si (that is a bounded number of trace points before/after si) for candidate sanitizers (for example by using the heuristics).

The string analysis uses built-in specifications for which string formats are allowed per a given security rule. On the other hand, the transformation applied by the candidate sanitizer can be approximated given some arbitrary string. The delta between the desired transformation and the transformation enforced by the candidate sanitizer can be deduced. Missing transformations can be compensated for by synthesizing appropriate code.

Step 305 instruments application A with supplementary trace point operations.

Step 306 tests for further trace point vulnerabilities. If the vulnerability is an existing vulnerability that has not been fixed in step 302A, then the process continues to step 307. Otherwise, the process returns to step 303 in order to further reduce the vulnerability.

Step 307 is the end of the process where the protected application A' is output.

Figure 4A:
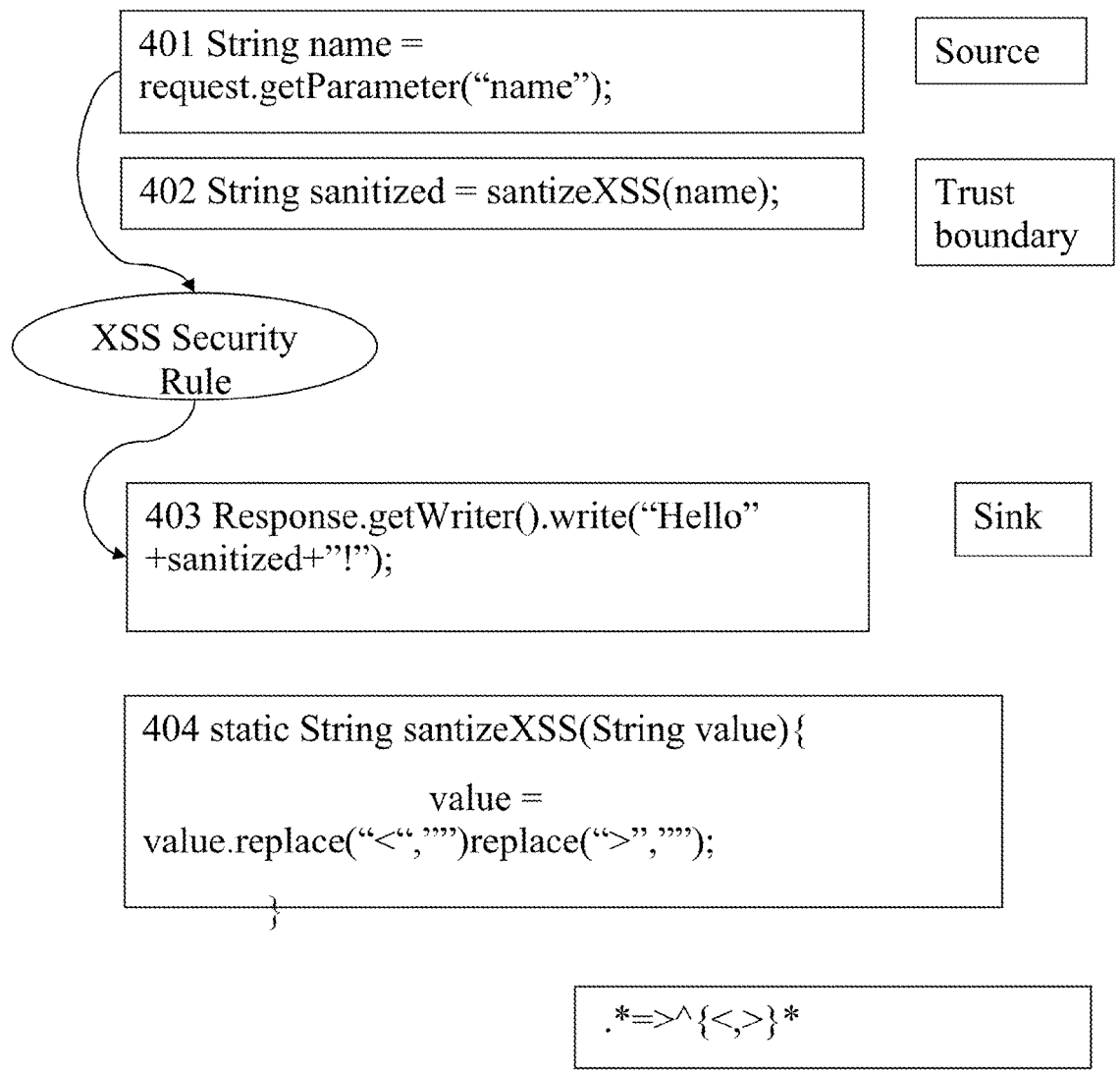
FIG. 4A is an example application before performance of the preferred embodiment.

Referring to FIG. 4A, an example Web service application portion (application A) in Java syntax (with additional line numbering) prior to protection processing is shown and described below.

```
401 String name = request.getParameter("name"); // source
402 String sanitized = sanitizeXSS(name);
403 response.getWriter( ).write("Hello " + sanitized + "!"); // sink
404 static String sanitizeXSS(String value) {
    value = value.replace("<","").replace(">","");
}
```

Analysis of a trace through the code above would indicate data flow between getParameter( ) (line 401) and response.getWriter( ).write( ) (line 403), which corresponds to a cross-site scripting (XSS) security rule. As shown at line 404, the application's existing protection operation disallows strings containing '<', '>' and replaces them with null characters. However the cross-site scripting (XSS) security rule disallows '<', '>' and any JavaScript ("JavaScript:*"). Disallowing JavaScript is not defined in the existing application A code.

Furthermore, according to the algorithm above, the call site of sanitizeXSS( ) will likely be marked as a trust boundary for the flow above. The next step is to approximate the transformation applied by sanitizeXSS via string analysis where the result, in the syntax of regular expressions, would be any of the following characters *=>^{<,>}*.

The preferred embodiment determines that application A has a vulnerability that leaves open the possibility of an attack via "JavaScript:*", identifies the vulnerable candidate trace point operation santizeXSS(name), computes a supplementary trace point operation santizeXSS1( ), and instruments the application with supplementary trace point operation santizeXSS1( ).

Referring to FIG. 4B, the example Web service protected application portion (application A') is shown after protection processing. In this example the underlined code has been added to transform the Web service application A into protected Web service application A':

```
401 String name = request.getParameter("name"); // source
402' String sanitized = sanitizeXSS1(sanitizeXSS(name));
403 response.getWriter( ).write("Hello " + sanitized + "!"); // sink
404 static String sanitizeXSS(String value) {
    value = value.replace("<","").replace(">","");
}
405 static String sanitizeXSS1(Stringvalue) {
    value = value.replace("javascript:","");
}
```

Line 402 has been enhanced to line 402' and now includes the existing operation sanitizeXSS( ) and the newly inserted sanitizeXXS1( ) operation (underlined in step 402' and 405). The new sanitizeXXS1( ) operation is defined in line 405 with the function of replacing any code preceded by a "javascript:" identifier with a null string. This enables a revolutionary and powerful approach to application security, which acknowledges the practical setting where this problem is to be solved, whereby developers may have limited security knowledge, and may find it hard to reason about complex end cases when implementing security defenses.

Applying this approach to protection of Web services appears promising. Experience suggests that Web services often perform only partial checking on incoming data, which may leave open certain attack scenarios. These may be exploited in practice by seasoned hackers. With the preferred embodiment, it may be possible to block such scenarios, where the ability exists to (i) instrument Web services, and (ii) test Web services with dynamic security payloads.

Further embodiments of the invention are now described. It will be clear to one of ordinary skill in the art that all or part of the logical process steps of the preferred embodiment may be alternatively embodied in a logic apparatus, or a plurality of logic apparatus, including logic elements arranged to perform the logical process steps of the method and that such logic elements may include hardware components, firmware components or a combination thereof.

It will be equally clear to one of skill in the art that all or part of the logic components of the preferred embodiment may be alternatively embodied in logic apparatus including logic elements to perform the steps of the method, and that such logic elements may include components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of the preferred embodiment may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fibre-optic cable), or electrical signals transmitted through a wire.

Computer-readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibres, wireless transmission, routers, firewalls, switches, gateway computers and/or edge servers. A network adapter card or network interface in each computing/processing device receives computer-readable program instructions from the network and forwards the computer-readable program instructions for storage in a computer readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for protecting a runtime Web service application, the system comprising:
    a memory configured to store an application and an instrumented version of the application;
    a processor in communication with the memory, wherein the memory storing processor-executable program instructions, that when executed, configure the processor to perform functions of:
        a trace instrumenter for enabling the application to log its operation and to create an execution trace;
        a vulnerability detector for identifying a trace point vulnerability using one or more data payloads, each data payload comprising an example set of data;
        a taint analyzer for identifying a candidate trace point operation associated with the trace point vulnerability by checking data flow through the application and the instrumented version of the application using one of the one or more data payloads and specifying a security rule to define the data flow, wherein the candidate trace point operation is an operation for which a payload value has been rejected by a validator or has been sanitized by a sanitizer;
        a string analyzer for computing a supplementary candidate operation based on the existing trace point operation and the trace point vulnerability; and
    a defensive instrumenter for instrumenting the runtime Web service application with the supplementary candidate operation, wherein the defensive instrumenter is further configured to apply a fix in the form of a trace point operation to the runtime Web service application.

2. The system of claim 1, wherein the identified trace point vulnerability is reported.

3. The system of claim 1, wherein the vulnerability detector starts over testing the runtime Web service application for further vulnerabilities.

4. The system of claim 1, wherein, the vulnerability detector performs further vulnerabilities testing after the runtime Web service application has been further instrumented with one or more supplementary candidate operations.

5. The system of claim 4, wherein in response to a pre-existing vulnerability being located again and being the same as a previously identified vulnerability, then no further measures are taken.

6. The system of claim 4, wherein in response to a new vulnerability being located, the functions protecting the runtime Web service application are repeated to address the new vulnerability.

7. A method for protecting a runtime Web service application comprising:
    enabling the runtime Web service application to log its operation and creation an execution trace;
    identifying a trace point vulnerability using one or more data payloads, each data payload comprising an example set of data, and one or more security rules;
    identifying a candidate trace point operation associated with the trace point vulnerability by checking data flow through an application and an instrumented version of the application using one of the one or more data payloads and specifying a security rule to define the data flow, wherein the candidate trace point operation is an operation for which a payload value has been rejected by a validator or has been sanitized by a sanitizer;
    computing a supplementary candidate operation based on the existing trace point operation and the trace point vulnerability;
    further enabling the runtime Web service application with the supplementary candidate operation; and
    applying a fix in the form of a trace point operation to the Web service application.

8. The method of claim 7, wherein the identified trace point vulnerability is reported.

9. The method of claim 7, further comprising starting over testing the runtime Web service application for further vulnerabilities.

10. The method of claim 7, further comprising performing further vulnerability testing after the runtime Web service application has been further instrumented with one or more supplementary candidate operations.

11. The method of claim 10, wherein in response to a pre-existing vulnerability being located again and being the same as the previously identified vulnerability, then no further measures are taken.

12. The method of claim 10, wherein in response to a new vulnerability being located, then the method for protecting the runtime Web service application is repeated to address the new vulnerability.

13. A computer program product for protecting a runtime Web service application, the computer program product comprising a tangible computer-readable storage device having computer-readable program code embodied therewith, the computer-readable program code configured to perform a method, the method comprising:
    enabling the runtime Web service application to log its operation and creation an execution trace;
    identifying a trace point vulnerability using one or more data payloads, each data payload comprising an example set of data, and one or more security rules;
    identifying a candidate trace point operation associated with the trace point vulnerability by checking data flow through an application and an instrumented version of the application using one of the one or more data payloads and specifying a security rule to define the data flow, wherein the candidate trace point operation is an operation for which a payload value has been rejected by a validator or has been sanitized by a sanitizer;

computing a supplementary candidate operation based on the existing trace point operation and the trace point vulnerability;

further enabling the runtime Web service application with the supplementary candidate operation; and applying a fix in the form of a trace point operation to the Web service application.

14. The computer program product of claim 13 wherein the identified trace point vulnerability is reported.

15. The computer program product of claim 13 wherein the method further comprises starting over testing the runtime Web service application for further vulnerabilities.

* * * * *